Patented Apr. 21, 1953

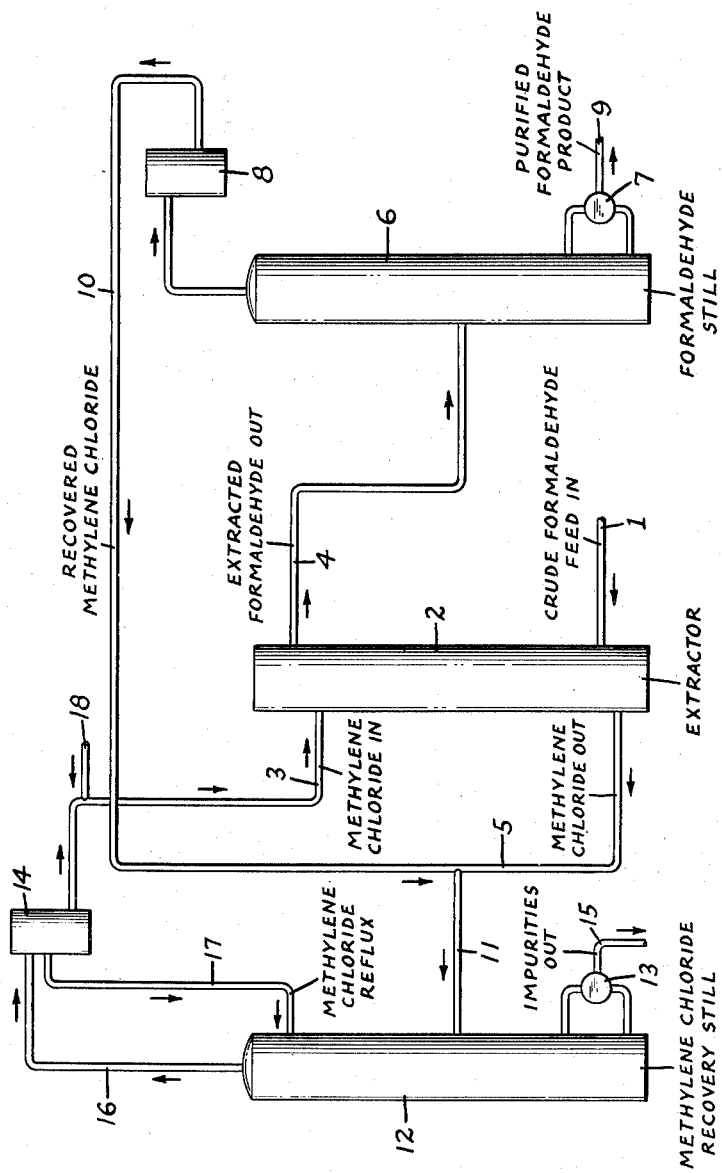

2,636,053

UNITED STATES PATENT OFFICE 2,636,053

TREATMENT OF AQUEOUS FORMALDEHYDE

Conant M. King, Jr., Kingsville, and Walter E. Heinz, Corpus Christi, Tex., assignors to Celanese Corporation of America, New York, N. Y., a corporation of Delaware Application March 27, 1951, Serial No. 217,824

7 Claims. (Cl. 260—606)

This invention relates to the treatment of aqueous formaldehyde solutions, and relates more particularly to an improved process for the production of purified aqueous formaldehyde solutions by extraction operations.

An object of this invention is to provide a process for the treatment of aqueous formaldehyde solutions, obtained as a product of the vapor phase partial oxidation of hydrocarbons, whereby undesirable impurities present therein may be substantially removed.

Another object of this invention is the provision of a process for the treatment of aqueous formaldehyde solutions, obtained from hydrocarbon oxidation processes, by extraction operations wherein the extraction may be carried out in a continuous manner.

A further object of this invention is the purification of aqueous formaldehyde solutions employing an extractant which is both stable and water-insoluble, which has a favorable boiling point and which has a low solvent power for formaldehyde.

Other objects of this invention will appear from the following detailed description and the accompanying drawing in which the figure is a schematic flow-sheet of our novel extraction process.

The vapor phase oxidation of aliphatic hydrocarbons is a major source of formaldehyde and formaldehyde from this process is now commercially available either as aqueous or alcoholic formaldehyde, as solid paraformaldehyde or as hexamethylenetetramine. Aqueous formaldehyde is obtained as a direct product of said oxidation reaction and such aqueous solutions may then be processed to yield the other forms of formaldehyde mentioned above. The problem of purifying the aqueous formaldehyde solutions obtained as a product of the vapor phase oxidation of aliphatic hydrocarbons to a degree sufficient to permit their unrestricted use throughout all industrial operations requiring formaldehyde proved to be a difficult one. However, the problem has been essentially overcome by employing carefully developed techniques involving a sequence of operations including pressure distillation, solvent extraction and the use of ion exchange media. At the present time, formaldehyde from vapor phase hydrocarbon oxidation operations, treated in the manner described above, has won complete acceptance industrially and without restriction except for certain very minor and highly specialized uses. Quantity-wise, these uses do not represent any appreciable proportion of the market demand, but the existence of even such a limited restriction in the utility of formaldehyde from hydrocarbon oxidation sources has necessitated further study of the problem of purification with the object of removing those impurities which still interfere with the free use of said formaldehyde. Since extraction processes have resulted in some improvement in quality, one possible approach appeared to be in an extension of extraction treatment. Various solvents differing markedly in structure, including hydrocarbons such as pentane, esters such as n-propyl acetate, long chain alcohols such as 2-ethyl hexanol, have been utilized for extraction operations. While measurable improvement has been realized, the results obtained have not been successful in producing formaldehyde solutions of a sufficiently high degree of purity to warrant their use in those few applications where formaldehyde from hydrocarbon oxidation operations has not heretofore been freely utilizable.

We have now found, however, that by extracting aqueous formaldehyde solutions obtained as a product of the vapor phase partial oxidation of hydrocarbons with a specific extractant, namely, methylene chloride, we are able to obtain an extracted product which may be readily and freely utilized wherever aqueous formaldehyde or other form of formaldehyde is employed. The impurities normally yielding an undesirable degree of color when a sample of the aqueous formaldehyde solution is reacted with sulfuric acid are substantially completely removed, the bromine number is reduced appreciably and the optical density of the solutions at wave lengths of 320 m$\mu$, 280 m$\mu$ and 260 m$\mu$ greatly improved. In addition, the surface tension of the extracted aqueous formaldehyde solutions undergoes a marked rise.

The extraction of said aqueous formaldehyde solutions is preferably carried out as a continuous operation employing a suitable countercurrent extraction system or a centrifugal solvent extractor. The ratio of solvent extractant to aqueous formaldehyde feed when carrying out the extraction operation in the extraction system employed herein, may vary from 0.1 to 6 volumes of solvent for each volume of aqueous formaldehyde feed introduced. The temperature at which extraction is carried out may also be varied but such variation in temperature has no appreciable effect on the efficiency of the extraction between temperatures of 20 to 60° C. Accordingly, the extraction may be carried out with equal facility at any convenient temperature in this range. Most preferably, the extraction is carried out employing a countercurrent extraction system employing aqueous formaldehyde solutions containing from 12 to 50% by weight of formaldehyde with the extraction being conducted at temperatures of from 20 to 60° C.

In order further to illustrate the novel process of our invention, but without being limited thereto, the following example is given, reference being had to the accompanying drawing.

*Example*

An aqueous formaldehyde solution obtained as a product of the vapor phase partial oxidation of butane and containing about 14% by weight of formaldehyde is steam distilled under a pressure of about 45 pounds per sq. inch gauge, and a 20% by weight aqueous formaldehyde solution is taken off overhead. The overhead product is then stripped of low boilers boiling below about 95 to 99° C., and vacuum evaporated to a concentration of 45% by weight.

1400 parts by weight per hour of the above crude aqueous 45% formaldehyde are passed through a feed inlet 1 into the base of a suitably packed extractor 2 and 3200 parts by weight per hour of methylene chloride are introduced into the top of extractor 2 through a line 3. The temperature in the extractor is maintained at 25 to 35° C. and the extraction is carried out at atmospheric or higher pressure. The methylene chloride and aqueous formaldehyde solution flow countercurrently with the extracted aqueous formaldehyde leaving the top of extractor 2 through a line 4 and the methylene chloride extractant leaving the base of extractor 2 through a line 5. The extracted aqueous formaldehyde is fed to a distilling column 6 provided with a reboiler 7 and a condenser 8. The methylene chloride in the extracted aqueous formaldehyde is stripped off and a stream of purified aqueous formaldehyde is removed from the reboiler 7 through a line 9.

The methylene chloride coming off overhead in column 6 is condensed in condenser 8 and cycled back through a line 10 where it joins the flow of methylene chloride leaving the base of extractor 2 through line 5. The two streams pass through a line 11 into a still 12, which functions as the methylene chloride recovery still. The recovery still 12 is provided with a reboiler 13 and an overflow condenser 14. The methylene chloride is distilled and purified in recovery still 12 and the impurities dissolved therein are removed from the base of reboiler 13 as a residue stream taken through a line 15. The overhead product from still 12 passes through line 16 to the condenser 14, the condensate returning to extractor 2 through a line 3. Reflux is returned to still 12 through line 17. Any make-up methylene chloride may be introduced into the system through a line 18 or directly into recovery still 12, for example.

Substantial improvements in the purity of the aqueous formaldehyde solutions treated in accordance with our novel process are obtained. Thus, for example, the percent color transmission rises from an initial value of 3% to as high as 70% and on subsequent redistillation the percent color transmission increases to 99%. The sulfuric acid color transmission is determined by adding 4 ml. of concentrated sulfuric acid dropwise to 10 ml. of aqueous formaldehyde and after mixing thoroughly determining the light-transmitted through the solution using a blue filter (400–465 m$\mu$) in a Lumetron colorimeter. The instrument is set to read 100% transmission using distilled water as a blank. The bromine number which is indicative of the concentration of unsaturated organic compounds falls from an initial value of 1.40 to a value of 0.21. On redistillation this value decreases to as low as 0.07. The bromine test is run by adding 5 ml. of 20% hydrochloric acid to 50 ml. of aqueous formaldehyde and titrating with 0.1N potassium bromide/bromate solution to the first yellow end point which persists for at least 15 seconds. The bromine number is obtained by dividing the number of milliliters of bromide/bromate solution employed to reach this end point by 10. Furthermore, the optical density of the aqueous formaldehyde when measured in ultra-violet light is also substantially improved. The optical density of the aqueous formaldehyde solution is measured at wave lengths of 320, 280 and 260 m$\mu$ in a Beckman spectrometer set at a slit width of 0.3 mm. A sample of 1 cm. thickness is used and measurements are made at 25° C. When reacted with ammonia, the purified aqueous formaldehyde obtained by our extraction process yields hexamine of a white color and with only a trace of odor.

It is to be understood that the foregoing detailed description is given merely by way of illustration and that many variations may be made therein without departing from the spirit of our invention.

Having described our invention, what we desire to secure by Letters Patent is:

1. In a process for the purification of aqueous formaldehyde solutions obtained from the partial oxidation of aliphatic hydrocarbons, the step which comprises subjecting an aqueous formaldehyde solution to extraction employing methylene chloride as the extractant.

2. In a process for the purification of aqueous formaldehyde solutions obtained from the partial oxidation of aliphatic hydrocarbons, the step which comprises subjecting an aqueous formaldehyde solution to countercurrent extraction employing methylene chloride as the extractant.

3. In a process for the purification of aqueous formaldehyde solutions obtained from the partial oxidation of aliphatic hydrocarbons, the step which comprises subjecting an aqueous formaldehyde solution to countercurrent extraction employing 0.1 to 6 volumes of methylene chloride as the extractant for each volume of aqueous formaldehyde being extracted.

4. Process for the purification of aqueous formaldehyde solutions obtained as a product of the vapor phase partial oxidation of aliphatic hydrocarbons, which comprises steam distilling said aqueous formaldehyde solution under pressure, removing low boiling components from the aqueous formaldehyde distillate, and subjecting the aqueous formaldehyde solution to extraction employing methylene chloride as the extractant.

5. Process for the purification of aqueous formaldehyde solutions obtained as a product of the vapor phase partial oxidation of aliphatic hydrocarbons, which comprises steam distilling said aqueous formaldehyde solution under pressure, removing low boiling components from the aqueous formaldehyde distillate, evaporating water from the distillate to concentrate the same, and subjecting the aqueous formaldehyde solution to extraction employing methylene chloride as the extractant.

6. Process for the purification of aqueous formaldehyde solutions obtained as a product of the vapor phase partial oxidation of aliphatic hydrocarbons, which comprises steam distilling said aqueous formaldehyde solution under pressure, removing low boiling components from the aqueous formaldehyde distillate, evaporating water from the distillate to concentrate the same, and subjecting the concentrated aqueous formaldehyde solution to countercurrent extraction employing methylene chloride as the extractant.

7. Process for the purification of aqueous formaldehyde solutions obtained as a product of the vapor phase partial oxidation of aliphatic hydrocarbons, which comprises steam distilling said aqueous formaldehyde solution under pressure, removing low boiling components from the aqueous formaldehyde distillate, evaporating water from the distillate to concentrate the same, and subjecting the concentrated aqueous formaldehyde solution to countercurrent extraction employing 0.1 to 6 volumes of methylene chloride for each volume of aqueous formaldehyde being extracted.

CONANT M. KING, Jr.
WALTER E. HEINZ.

References Cited in the file of this patent

UNITED STATES PATENTS

| Number | Name | Date |
|---|---|---|
| 2,537,169 | Stautzenberger et al. | Jan. 9, 1951 |